United States Patent
Asaba

(10) Patent No.: US 12,447,841 B2
(45) Date of Patent: Oct. 21, 2025

(54) ELECTRIFIED VEHICLE

(71) Applicant: TOYOTA JIDOSHA KABUSHIKI KAISHA, Toyota (JP)

(72) Inventor: Kotaro Asaba, Nagoya (JP)

(73) Assignee: TOYOTA JDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/484,850

(22) Filed: Oct. 11, 2023

(65) Prior Publication Data
US 2024/0190275 A1   Jun. 13, 2024

(30) Foreign Application Priority Data
Dec. 9, 2022 (JP) .................... 2022-197272

(51) Int. Cl.
| | | |
|---|---|---|
| *H02P 1/00* | (2006.01) | |
| *B60L 15/00* | (2006.01) | |
| *B60L 50/60* | (2019.01) | |
| *B60L 53/16* | (2019.01) | |
| *B60L 53/24* | (2019.01) | |
| *H02J 7/00* | (2006.01) | |
| *H02P 27/06* | (2006.01) | |
| *B60K 1/02* | (2006.01) | |

(52) U.S. Cl.
CPC ............ *B60L 53/24* (2019.02); *B60L 15/007* (2013.01); *B60L 50/60* (2019.02); *B60L 53/16* (2019.02); *H02J 7/0068* (2013.01); *H02P 27/06* (2013.01); *B60K 1/02* (2013.01); *B60L 2210/40* (2013.01); *B60L 2220/42* (2013.01)

(58) Field of Classification Search
CPC .. H02P 27/06; H02P 5/74; H02P 27/08; B60L 53/24
See application file for complete search history.

(56) References Cited

U.S. PATENT DOCUMENTS

| | | |
|---|---|---|
| 11,171,504 B2 | 11/2021 | Lee et al. |
| 2004/0222754 A1 | 11/2004 | Ochiai et al. |
| 2014/0095005 A1 | 4/2014 | Kanzaki et al. |

FOREIGN PATENT DOCUMENTS

| | | | | |
|---|---|---|---|---|
| EP | 2196351 A1 | * | 6/2010 | ............ B60L 53/122 |
| JP | 2004-336885 A | | 11/2004 | |
| JP | 2009-027831 A | | 2/2009 | |
| WO | 2012/164680 A1 | | 12/2012 | |

* cited by examiner

*Primary Examiner* — Karen Masih
(74) *Attorney, Agent, or Firm* — SoraIP, Inc.

(57) ABSTRACT

Electrified vehicle includes a first motor, a battery for supplying power to the first motor, a first inverter for converting DC power from the battery into AC power supplied to the first motor, a charging inlet for receiving charging power for charging the battery, a charging circuit for connecting the charging inlet to the first inverter via a neutral point of the first motor, and a control device for controlling the operation of the first inverter. The charging circuit includes a charging smoothing capacitor provided between the charging inlet and the first motor. After the charging of the battery by the charging device is completed, the control device causes the first inverter to perform the boosting operation to discharge the charge accumulated in the charging smoothing capacitor from the first inverter to the battery side.

5 Claims, 7 Drawing Sheets

SECOND EMBODIMENT

ELECTRIFIED VEHICLE

CROSS-REFERENCE TO RELATED APPLICATION

This application claims priority to Japanese Patent Application No. 2022-197272 filed on Dec. 9, 2022, incorporated herein by reference in its entirety.

BACKGROUND

1. Technical Field

A technique disclosed in the present specification relates to an electrified vehicle.

2. Description of Related Art

U.S. patent Ser. No. 11/171,504 discloses an electrified vehicle including: a motor for driving a wheel of the electrified vehicle; a battery for supplying power to a motor for traveling; an inverter that is provided between the battery and the motor and converts direct current power from the battery to alternating current power supplied to the motor; a charging inlet that is detachably connected to an external charging device and receives charging power for charging the battery; a charging circuit for connecting the charging inlet to the inverter via a neutral point of the motor; and a control device for controlling an operation of the inverter. The charging circuit includes a charging smoothing capacitor provided between the charging inlet and the motor.

SUMMARY

In U.S. patent Ser. No. 11/171,504, a battery is charged by an electrified vehicle receiving charging power from a charging device. When the battery is charged, electric charge is accumulated in a charging smoothing capacitor. Therefore, when charging of the battery is completed, the electric charge is accumulated in the charging smoothing capacitor. The electric charge accumulated in the charging smoothing capacitor may flow in an unintended path. Therefore, it is not desirable that the electric charge remains in the charging smoothing capacitor.

In the present specification, a technique capable of reducing the electric charge remaining in the charging smoothing capacitor is provided.

A first aspect disclosed in the present specification provides an electrified vehicle.

The electrified vehicle includes:
 a first motor for driving a first wheel of the electrified vehicle;
 a battery for supplying power to the first motor;
 a first inverter that is provided between the battery and the first motor and converts direct current power from the battery to alternating current power supplied to the first motor;
 a charging inlet that is detachably connected to an external charging device and receives charging power for charging the battery;
 a charging circuit for connecting the charging inlet to the first inverter via a neutral point of the first motor; and
 a control device for controlling an operation of the first inverter.

The charging circuit includes a charging smoothing capacitor provided between the charging inlet and the first motor, and after charging of the battery by the charging device is completed, the control device causes the first inverter to execute a boosting operation, and discharges electric charge accumulated in the charging smoothing capacitor from the first inverter to the battery side.

According to the above configuration, the electric charge accumulated in the charging smoothing capacitor during charging of the battery is discharged from the first inverter to the battery side by the boosting operation executed by the first inverter. Therefore, the electric charge remaining in the charging smoothing capacitor can be reduced.

In a second aspect, in the above first aspect,
 the charging circuit may further include a first relay provided between the charging inlet and the charging smoothing capacitor.

The control device may electrically open the first relay before executing the boosting operation.

When the first relay is electrically connected, the electric charge is accumulated in the charging smoothing capacitor, and the electric charge cannot be discharged from the charging smoothing capacitor. According to the above configuration, the electric charge accumulated in the charging smoothing capacitor can be discharged.

In a third aspect, in the above first or second aspect,
 the electrified vehicle may further include a second relay provided between the battery and the first inverter.

The control device may electrically open the second relay before starting the boosting operation.

According to the above configuration, it is possible to suppress the electric charge accumulated in the charging smoothing capacitor from flowing to the battery and causing the battery to be charged unintentionally.

In a fourth aspect, in the above third aspect,
 the electrified vehicle may further include a smoothing capacitor for traveling provided between the battery and the first inverter.

The charging circuit may further include a third relay provided between the charging smoothing capacitor and the neutral point of the first motor.

The control device
 may electrically open the third relay after completing the boosting operation, and
 may control the first inverter and electrically connect the smoothing capacitor for traveling and the first motor after opening the third relay.

According to the above configuration, the electric charge accumulated in the charging smoothing capacitor flows to the smoothing capacitor for traveling by the boosting operation executed by the first inverter, and the electric charge is accumulated in the smoothing capacitor for traveling. Then, after the boosting operation is completed, the third relay is electrically opened, and the smoothing capacitor for traveling and the first motor are electrically connected to each other, whereby the electric charge accumulated in the smoothing capacitor for traveling flows to the first motor and is discharged. Therefore, it is possible to suppress the electric charge accumulated in the smoothing capacitor for traveling from flowing to an unintended path.

A fifth aspect provides an electrified vehicle.

The electrified vehicle includes:
 a first motor for driving a first wheel of the electrified vehicle;
 a battery for supplying power to the first motor;
 a first inverter that is provided between the battery and the first motor and converts direct current power from the battery to alternating current power supplied to the first motor;

a charging inlet that is detachably connected to an external charging device and receives charging power for charging the battery;

a charging circuit for connecting the charging inlet to the first inverter via a neutral point of the first motor;

a second motor for driving a second wheel of the electrified vehicle;

a second inverter that is provided between the battery and the second motor, and the battery and the first inverter, and converts direct current power from the battery to alternating current power supplied to the second motor;

a specific relay provided between the battery and the second inverter; and a control device for controlling operations of the first inverter and the second inverter. The charging circuit includes a charging smoothing capacitor provided between the charging inlet and the first motor, and the control device opens the specific relay after charging of the battery by the charging device is completed, and discharges electric charge accumulated in the charging smoothing capacitor from the second inverter by controlling the second inverter and electrically connecting the second inverter and the second motor after opening the specific relay.

According to the above configuration, the second inverter and the second motor are electrically connected to each other, so that the electric charge accumulated in the charging smoothing capacitor flows to the second motor via the first inverter and the second inverter, and is discharged. Therefore, the electric charge remaining in the charging smoothing capacitor can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
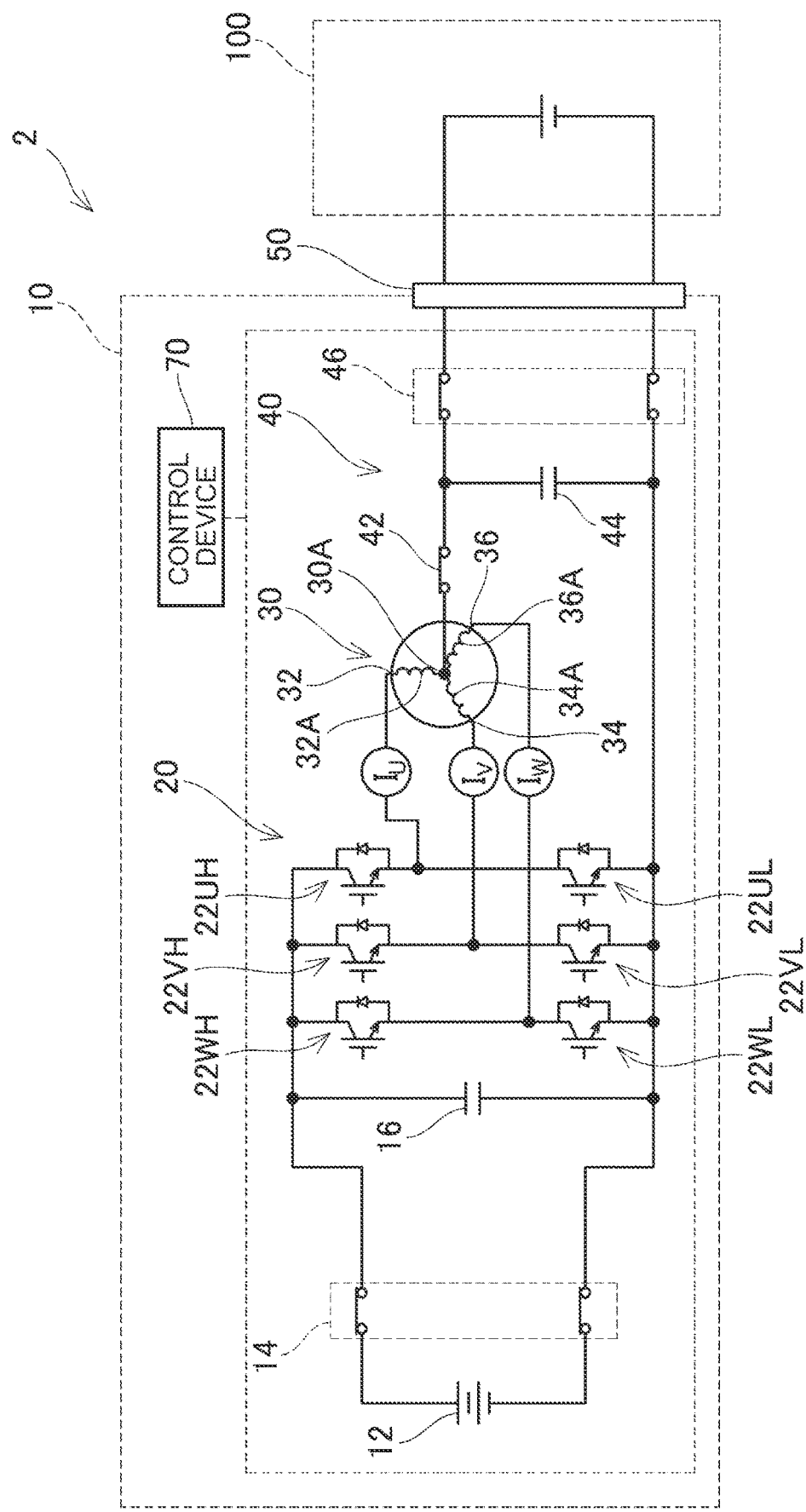
FIG. 1 shows a circuit diagram of a charging system 2 according to a first embodiment.

As illustrated in FIG. 1, the charging system 2 includes an electrified vehicle 10 and a charging device 100. Electrified vehicle 10 includes a battery 12, a system main relay 14, a smoothing capacitor for traveling 16, a first inverter 20, a first motor 30, a charging circuit 40, a charging inlet 50, and a control device 70. The charging inlet 50 is detachably connected to the charging device 100 and receives charging power for charging the battery 12.

The battery 12 is a rechargeable secondary battery including a plurality of secondary battery cells (not shown), such as lithium ion cells, and configured to be repeatedly chargeable and dischargeable. The battery 12 is typically a lithium-ion battery. The battery 12 is connected to the first inverter 20 via the system main relay 14. The operation of the system main relay 14 is controlled by the control device 70.

The smoothing capacitor for traveling 16 is provided between the battery 12 and the first inverter 20. The smoothing capacitor for traveling 16 is provided to stabilize the voltage of electrified vehicle 10 circuit.

The first inverter 20 is provided between the smoothing capacitor for traveling 16 and the first motor 30. The first inverter 20 is a device that converts DC power from the battery 12 into AC power. The first inverter 20 includes three upper switching elements 22UH, 22VH, 22WH and three lower switching elements 22UL, 22VL, 22WL. Hereinafter, the "switching element" will be referred to as a "SW element". The upper SW elements 22UH, 22VH, 22WH are connected in series to the lower SW elements 22UL, 22VL, 22WL.

A midpoint between the upper SW element 22UH and the lower SW element 22UL connected in series is electrically connected to the U-phase terminal 32 of the first motor 30. Thus, the upper SW device 22UH and the lower SW device 22UL constitute a pair of upper and lower U-phase arms that connect the U-phase terminal 32 of the first motor 30 to the positive or negative electrode of the battery 12. Similarly, the upper SW element 22VH and the lower SW element 22VL connected in series constitute a pair of upper and lower V-phase arms. The midpoint between them is electrically connected to the V-phase terminal 34 of the first motor 30. The upper SW element 22WH and the lower SW element 22WL connected in series constitute a pair of upper and lower W-phase arms. The midpoint between them is electrically connected to the W-phase terminal 36 of the first motor 30. The operation of the three lower SW elements 22UL, 22VL, 22WL and the operation of the three lower SW elements 22UL, 22VL, 22WL are controlled by the control device 70.

The first motor 30 is a three-phase AC motor that drives the front wheels of electrified vehicle 10 by using electric power supplied from the battery 12. The first motor 30 includes a U-phase coil 32A, a V-phase coil 34A, and a W-phase coil 36A. One ends of the U-phase coil 32A, the V-phase coil 34A, and the W-phase coil 36A are connected to the U-phase terminal 32, the V-phase terminal 34, and the W-phase terminal 36, respectively. The other ends of the U-phase coil 32A, the V-phase coil 34A, and the W-phase coil 36A are connected to each other at a neutral point 30A.

The charging circuit 40 is a circuit for supplying electric power from the charging device 100 to the battery 12. The charging circuit 40 includes a first charging relay 42, a charging smoothing capacitor 44, and a second charging relay 46. The charging smoothing capacitor 44 is provided between the first motor 30 and the charging inlet 50. The charging smoothing capacitor 44 is provided to stabilize the voltage of the charging circuit 40. The first charging relay 42 is provided between the neutral point 30A of the first motor 30 and the first charging relay 42. The second charging relay 46 is provided between the charging inlet 50 and the charging smoothing capacitor 44. The operations of the first charging relay 42 and the second charging relay 46 are controlled by the control device 70.

The control device 70 is a computer including a CPU. The control device 70 controls operations of the system main relay 14, the upper SW device 22UH, 22VH, 22WH, the lower SW device 22UL, 22VL, 22WL, the first charging relay 42, and the second charging relay 46.

Charging processing executed by the control device 70 will be described. The control device 70 starts the charging process when the charging device 100 is connected to the charging inlet 50. First, as shown in FIG. 1, the control device 70 electrically connects the system main relay 14, the first charging relay 42, and the second charging relay 46. In the present embodiment, the voltage of the charging power received from the charging device 100 by electrified vehicle 10 through the charging inlet 50 is lower than the rated voltage of the battery 12. Therefore, the control device 70 performs the boosting operation to charge the battery 12. More specifically, the control device 70 repeatedly turns on and off at least one of the lower SW elements 22UH, 22VH, 22WH while keeping the upper SW elements 22UL, VL, WL off. The control device 70 controls the duty cycle of the lower SW elements to be turned on and off. Note that the control device 70 may symmetrically turn on and off the upper SW elements 22UL, VL, WL in synchronization with the lower SW elements 22UH, 22VH, 22WH to be repeatedly turned on and off. For example, the lower SW device 22UL is turned on and off. When the lower SW device 22UL is turned on, a current flows through the U-phase coil 32A and the lower SW device 22UL. The U-phase coil 32A stores energy. When the lower SW device 22UL is turned off in this condition, the energy stored in the U-phase coil 32A is superimposed on the electric power from the battery. As a result, the voltage of the electric power supplied from the first inverter 20 to the battery 12 is boosted. Accordingly, the battery 12 is charged. At this time, the charge is also accumulated in the charging smoothing capacitor 44.

Figure 2:
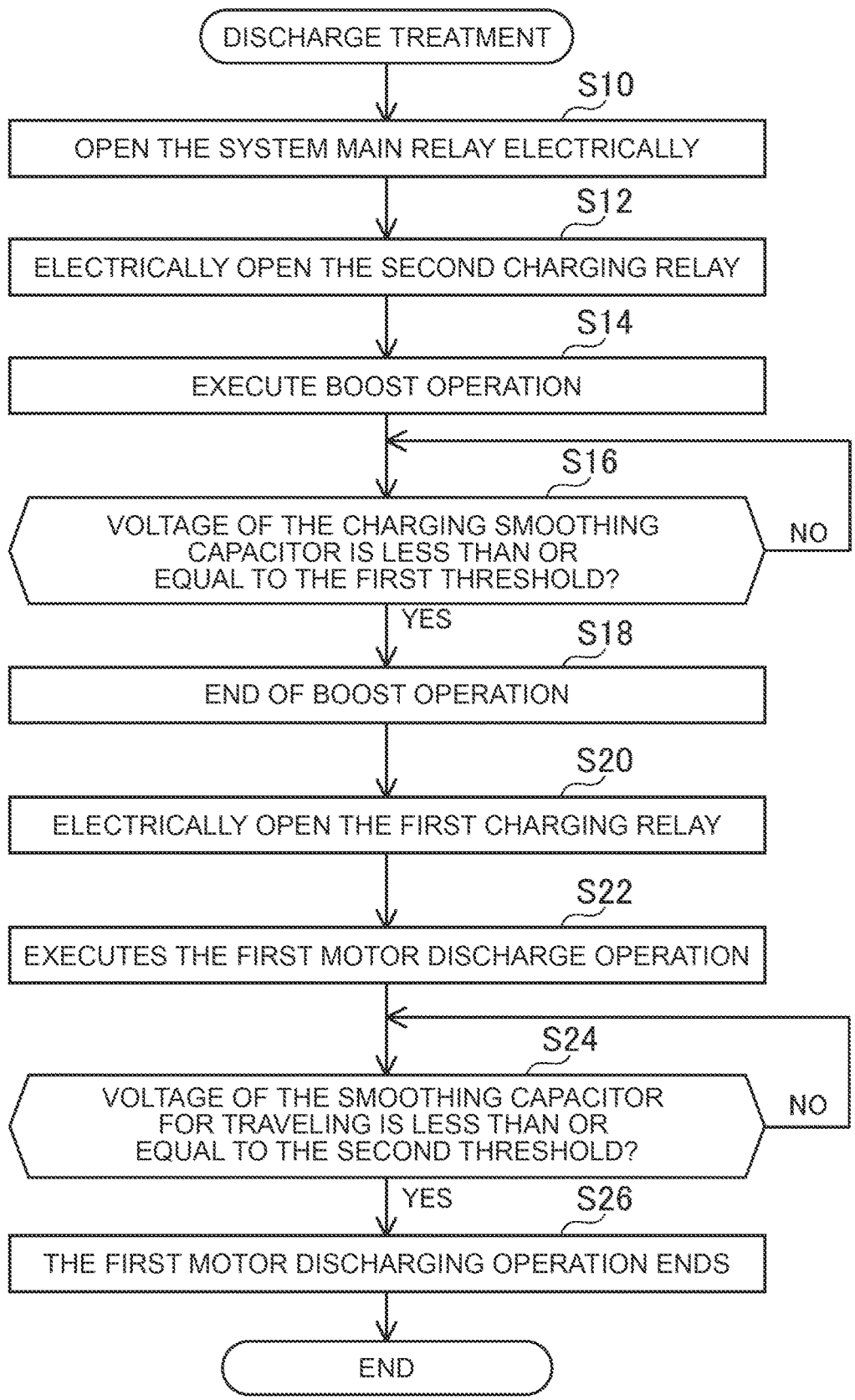
FIG. 2 shows a flow chart of the discharging process performed by electrified vehicle 10 of the first embodiment.

Discharge Treatment; FIG. 2

Referring to FIG. 2, a discharging process executed by the control device 70 of electrified vehicle 10 will be described. When the charging process ends, the control device 70 starts the process of FIG. 2. Thus, after the charging process is completed, the charge accumulated in the charging smoothing capacitor 44 is discharged.

Figure 3:
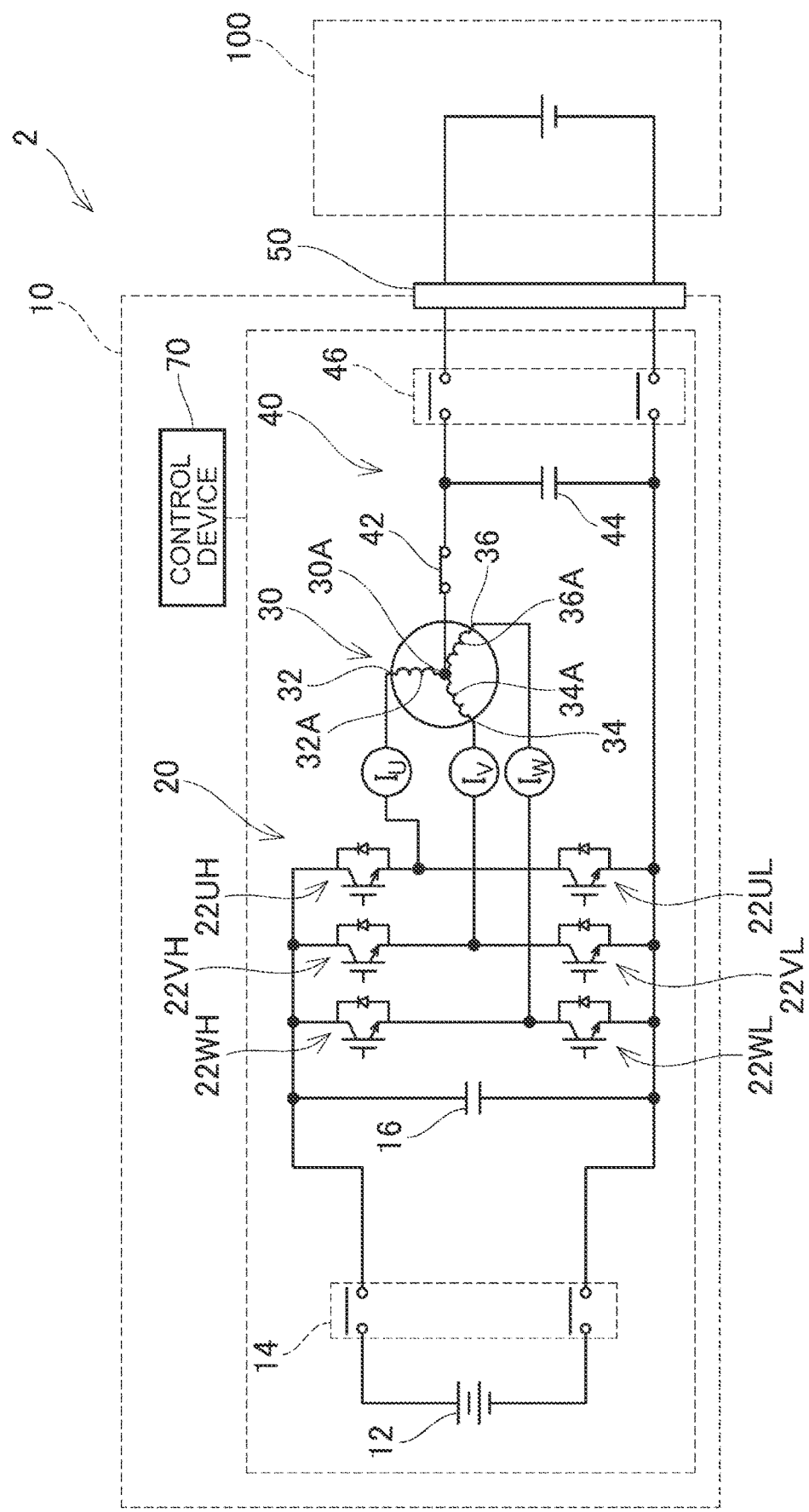
FIG. 3 shows, in a first embodiment, a circuit diagram of the charging system 2 when the step-up operation is performed.

In S10, the control device 70 electrically opens the system main relay 14, and in S12, electrically opens the second charging relay 46 (see FIG. 3).

In S14, the control device 70 causes the first inverters 20 to perform the boosting operation. The step-up operation in S14 is the same as the step-up operation performed at the time of the charge process. As a result, the charge accumulated in the charging smoothing capacitor 44 in the charging process flows to the battery 12 side. Then, the electric charge flowing to the battery 12 side is accumulated in the smoothing capacitor for traveling 16.

In S16, the control device 70 monitors that the voltage of the charging smoothing capacitor 44 becomes equal to or lower than the first threshold. In the present embodiment, when the elapsed time from the start of the boosting operation becomes equal to or longer than the first predetermined time, the control device 70 determines that the voltage of the charging smoothing capacitor 44 becomes equal to or smaller than the first threshold, determines that the voltage is YES in S16, and proceeds to S18. The first predetermined time is a time sufficient for the voltage of the charging smoothing capacitor 44 to be equal to or lower than the first threshold value. In the modified example, the control device 70 may determine that the voltage of the charging smoothing capacitor 44 is equal to or lower than the first threshold value by using a voltage sensor that detects the voltage of the charging smoothing capacitor 44.

In S18, the control device 70 ends the boosting operation by the first inverters 20.

Figure 4:
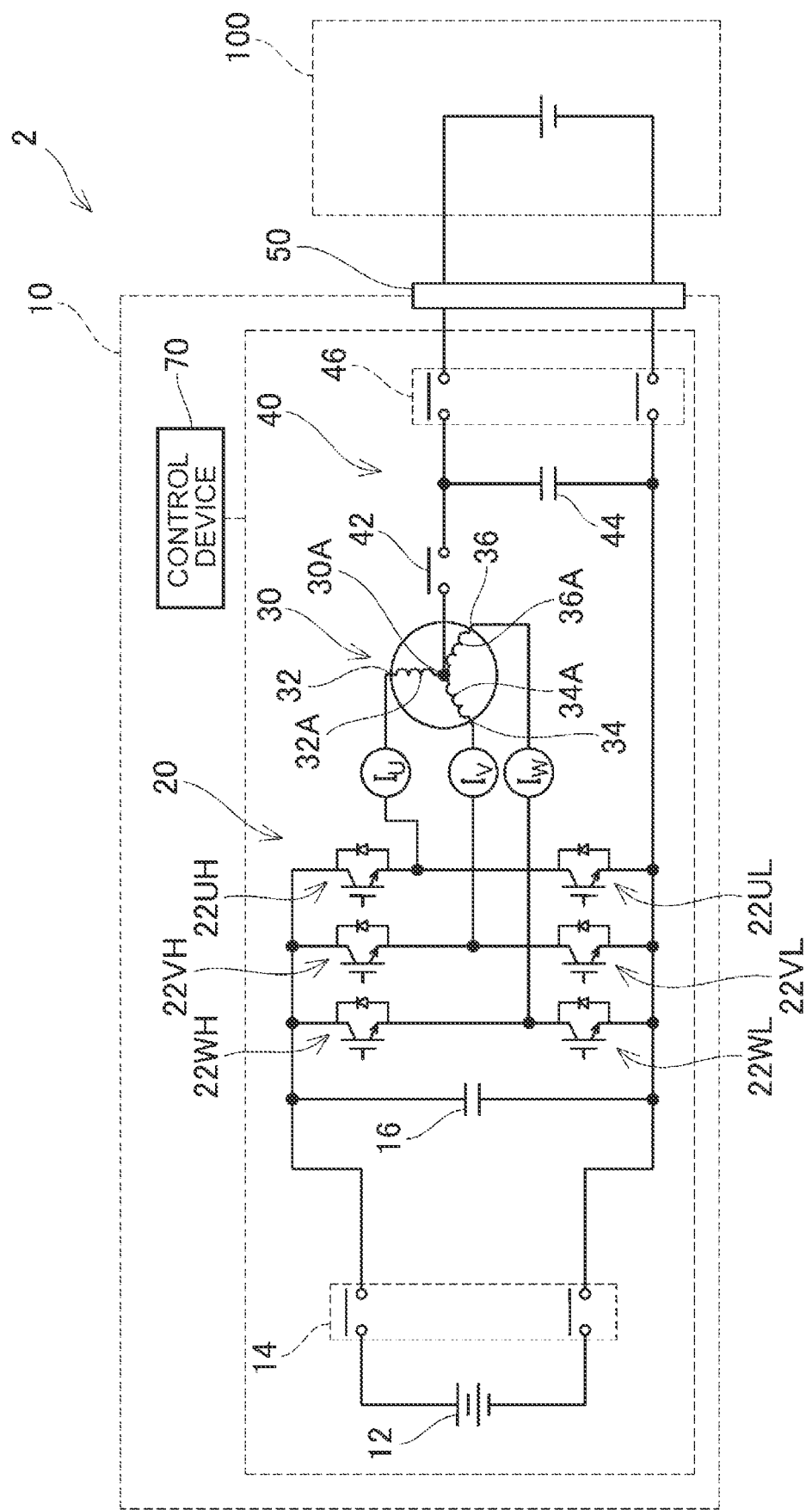
FIG. 4 shows a circuit diagram of the charging system 2 when a first motor discharging operation is performed in a first embodiment.
Figure 5:
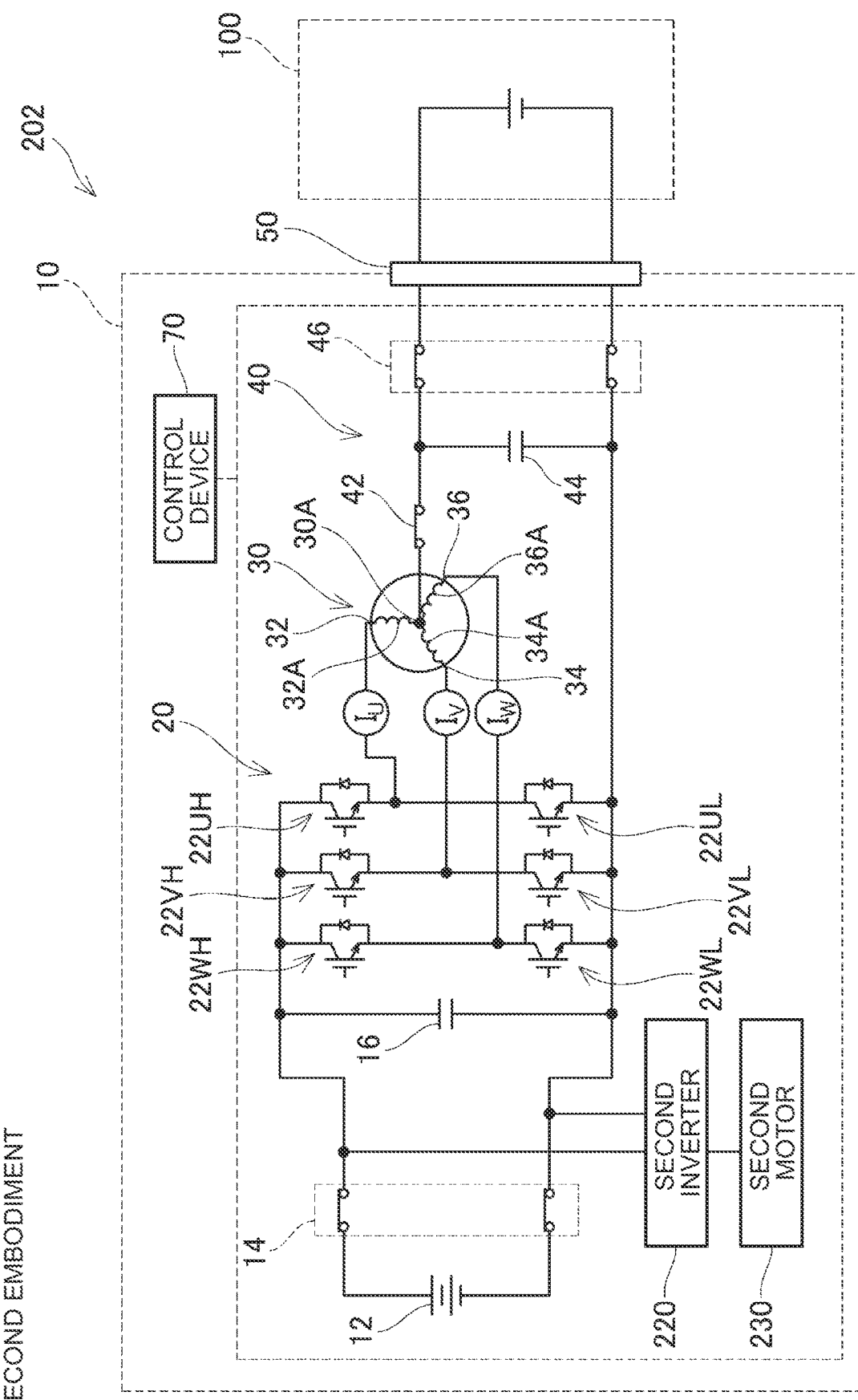
FIG. 5 shows a circuit diagram of a charging system 202 according to a second embodiment.

In S20, the control device 70 electrically opens the first charging relay 42 (see FIG. 4).

In S22, the control device 70 executes a first motor discharging operation using the first motor 30. The first motor discharging operation is performed to discharge the electric charge accumulated in the smoothing capacitor for traveling 16 by energizing the first motor 30 so as not to generate torque. For example, the control device 70 turns on the upper SW elements 22UH of the U-phase arm and the lower SW elements 22VL of the V-phase arm. Thus, the smoothing capacitor for traveling 16 is electrically connected to the first motor 30 via the first inverter 20. As a result, the electric charge accumulated in the smoothing capacitor for traveling 16 is discharged.

In S24, the control device 70 monitors that the voltage of the smoothing capacitor for traveling 16 becomes equal to or lower than the second threshold. In the present embodiment, when the elapsed time from the start of the motor discharging operation becomes equal to or longer than the second predetermined time, the control device 70 determines that the voltage of the smoothing capacitor for traveling 16 becomes equal to or lower than the second threshold, determines that the voltage is YES in S24, and proceeds to S26. The second predetermined time is a time sufficient for the voltage of the smoothing capacitor for traveling 16 to be equal to or lower than the second threshold value. In the modified example, the control device 70 may determine that the voltage of the smoothing capacitor for traveling 16 is equal to or lower than the second threshold value by using a voltage sensor that detects the voltage of the smoothing capacitor for traveling 16.

In S26, the control device 70 ends the motor discharging operation. When S26 ends, the control device 70 ends the process of FIG. 2.

As described above, electrified vehicle 10 includes a first motor 30 that drives a front wheel (an example of a "first wheel") of electrified vehicle 10, a battery 12 that supplies electric power to the first motor 30, a first inverter 20 that is provided between the battery 12 and the first motor 30 and converts DC power from the battery 12 into AC power that is supplied to the first motor 30, a charging inlet 50 that is detachably connected to the external charging device 100 and receives charging power for charging the battery 12, a charging circuit 40 that connects the charging inlet 50 to the first inverter 20 via a neutral point 30A of the first motor 30, and a control device 70 that controls the operation of the first inverter 20. The charging circuit 40 includes a charging smoothing capacitor 44 provided between the charging inlet 50 and the first motor 30. After the charging of the battery 12 by the charging device 100 is completed, the control device 70 causes the first inverter 20 to perform the boosting operation, thereby discharging the charge accumulated in the charging smoothing capacitor 44 from the first inverter 20 toward the battery 12 (S14 in FIG. 2).

According to the above configuration, the charge accumulated in the charging smoothing capacitor 44 during charging of the battery 12 is discharged from the first inverter 20 to the battery 12 side by the boosting operation executed by the first inverter 20. Therefore, after the charging of the battery 12 is completed, the charge accumulated in the charging smoothing capacitor 44 can be discharged quickly.

The charging circuit 40 further includes an example of a second charging relay 46 ("first relay") provided between the charging inlet 50 and the charging smoothing capacitor 44. The control device 70 electrically opens the second charging relay 46 prior to executing the boost operation (S12 in FIG. 2).

According to the above configuration, the charge stored in the charging smoothing capacitor 44 can be discharged.

Electrified vehicle 10 further includes a system main relay 14 (exemplary second relay) provided between the battery 12 and the first inverter 20. The control device 70 electrically opens the system main relay 14 prior to starting the boosting operation (S10 in FIG. 2).

According to the above-described configuration, it is possible to suppress the charge accumulated in the charging smoothing capacitor 44 from flowing to the battery 12 and causing the battery 12 to be unintentionally charged.

Electrified vehicle 10 further includes a smoothing capacitor for traveling 16 provided between the battery 12 and the first inverters 20. The charging circuit 40 further includes a first charging relay 42 (an exemplary "third relay") provided between the charging smoothing capacitor 44 and the neutral point 30A of the first motor 30. After the step-up operation is completed, the control device 70 electrically opens the first charging relay 42 (S20 in FIG. 2). After opening the first charging relay 42, the control device 70 controls the first inverter 20 to electrically connect the smoothing capacitor for traveling 16 and the first motor 30 (S22).

According to the above configuration, the charge accumulated in the charging smoothing capacitor 44 flows to the smoothing capacitor for traveling 16 by the boosting operation performed by the first inverter 20, and the charge is accumulated in the smoothing capacitor for traveling 16. Then, after the step-up operation is completed, the first charging relay 42 is electrically opened, and the smoothing capacitor for traveling 16 and the first motor 30 are electrically connected to each other, whereby the electric charge accumulated in the smoothing capacitor for traveling 16 flows to the first motor 30 and is discharged. Therefore, it is possible to suppress the charge accumulated in the smoothing capacitor for traveling 16 from flowing to an unintended path.

Second Embodiment

The charging system 202 of the second embodiment will be described. In the present embodiment, the configuration of electrified vehicle 210 differs from the configuration of electrified vehicle 10 of the first embodiment. Note that the same reference numerals are given to configurations common to the embodiments, and description thereof will be omitted.

Electrified vehicle 210 includes a second inverter 220 and a second motor 230. The configuration of the second inverter 220 is the same as that of the first inverter 20. The second inverter 220 is provided between the battery 12 and the smoothing capacitor for traveling 16. The configuration of the second motor 230 is the same as that of the first motor 30. The second motor 230 is a three-phase AC motor that drives the rear wheels of electrified vehicle 10 by using electric power supplied from the battery 12. The second motor 230 is connected to the second inverter 220.

Figure 6:
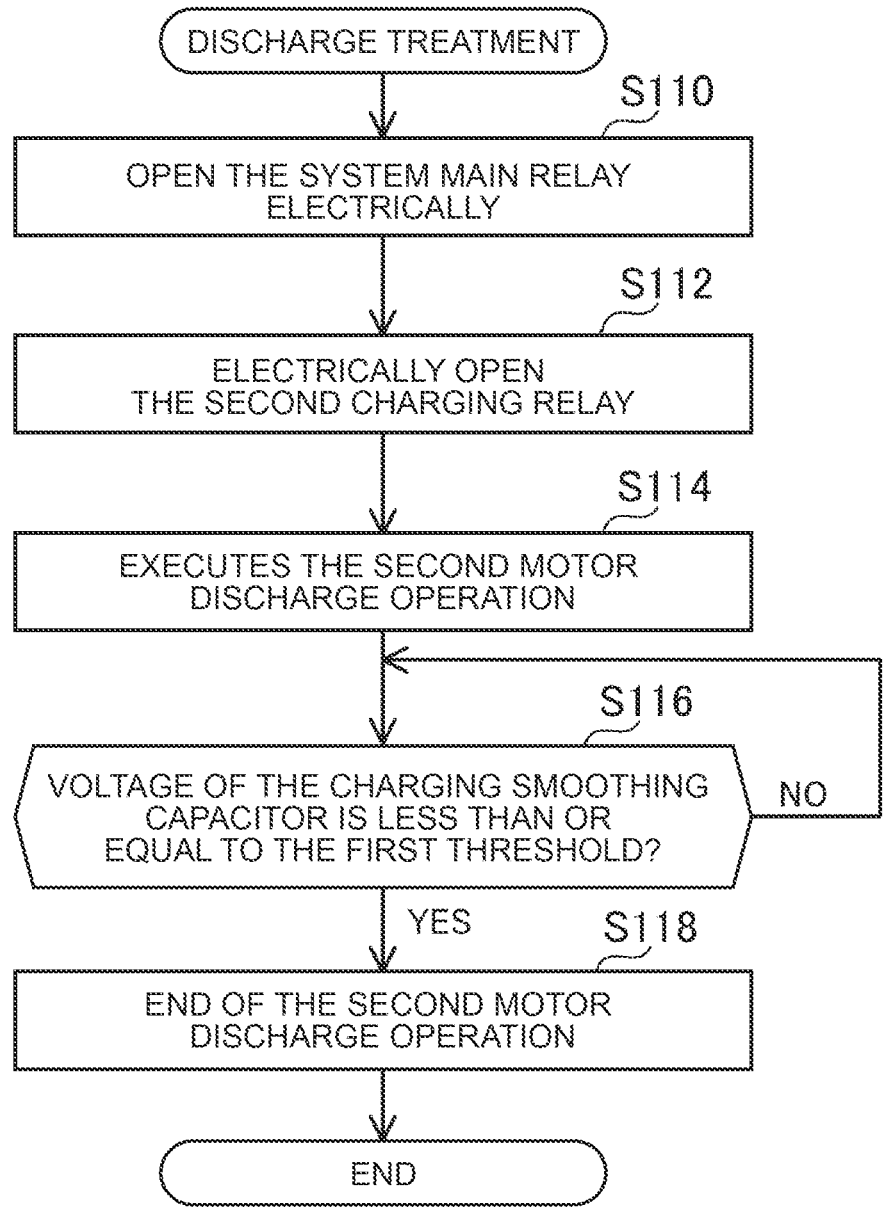
FIG. 6 shows a flow chart of the discharging process performed by electrified vehicle 210 of the second embodiment.
Figure 7:
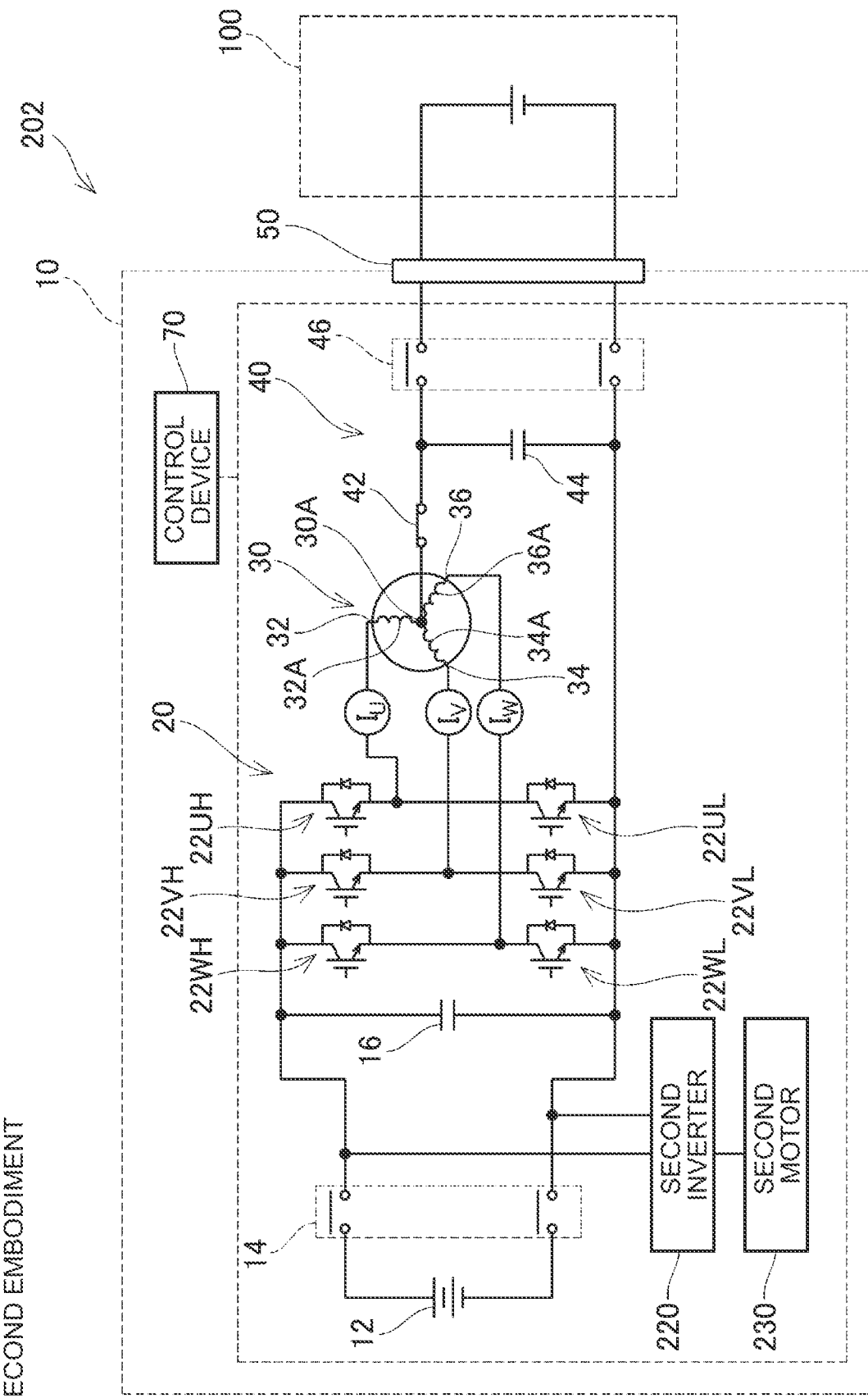
FIG. 7 is a schematic diagram of the charging system 202 when a second motor discharging operation is performed in the second embodiments.

Discharge Treatment; FIG. 6

Referring to FIG. 6, a discharging process executed by the control device 70 of electrified vehicle 210 will be described. S110, S112 of FIG. 6 are each similar to S10, S112 of FIG. 2.

In S114, the control device 70 executes a second motor discharging operation using the second motor 230. In the second motor discharging operation, the control device 70 controls the second inverter 220 to electrically connect the charging smoothing capacitor 44 to the second motor 230 via the first inverter 20 and the second inverter 220. As a result, the charge accumulated in the charging smoothing capacitor 44 is discharged through the second motor 230 via the first inverter 20 (specifically, the reflux-diode of the upper SW device 22UH, 22VH, 22WH and the lower SW device 22UL, 22VL, 22WL) and the second inverter 220.

S116 is similar to S16 of FIG. 2. In S118, the control device 70 ends the second motor discharging operation. When S118 ends, the control device 70 ends the process of FIG. 6. In the modification, the control device 70 may execute S114 process while executing the boosting operation of S14 of FIG. 2.

As described above, electrified vehicle 210 includes the first motor 30, the battery 12, the first inverter 20, the charging inlet 50, the charging circuit 40, the second motor 230 that drives the rear wheels of electrified vehicle 210 (an example of the "second wheels"), the second inverter 220 that is provided between the battery 12 and the second motor 230, and between the battery 12 and the first inverter 20 and that converts the DC power from the battery 12 into the AC power supplied to the second motor 230, the system main relay 14 (an example of a "specific relay") that is provided between the battery 12 and the second inverter 220, and the control device 70 that controls the operations of the first inverter 20 and the second inverter 220. The charging circuit 40 includes a charging smoothing capacitor 44 provided between the charging inlet 50 and the first motor 30. After the charging of the battery 12 by the charging device 100 is completed, the control device 70 opens the system main relay 14 (S110 in FIG. 6). After opening the system main relay 14, the control device 70 controls the second inverter 220 to electrically connect the second inverter 220 and the second motor 230, thereby discharging the charge stored in the charging smoothing capacitor 44 from the second inverter 220 (S114 in FIG. 6).

According to the above configuration, the second inverter 220 and the second motor 230 are electrically connected to each other, so that the electric charge accumulated in the charging smoothing capacitor 44 flows to the second motor 230 via the first inverter 20 and the second inverter 220, and is discharged. Therefore, the charge remaining in the charging smoothing capacitor 44 can be reduced.

Although the specific examples disclosed by the present disclosure have been described in detail above, these are merely examples and do not limit the scope of claims. The techniques described in the claims include various modifications and alternations of the specific example illustrated above. Modifications of the above-described embodiment are listed below.

First Modification

The control device 70 may electrically open the system main relay 14 after S14 of FIG. 2.

Second Modification

S12 of FIG. 2 can be omitted.

The technical elements described in the present specification or drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. An electrified vehicle comprising:
a first motor for driving a first wheel of the electrified vehicle;
a battery for supplying power to the first motor;
a first inverter that is provided between the battery and the first motor and converts direct current power from the battery to alternating current power supplied to the first motor;
a charging inlet that is detachably connected to an external charging device and receives charging power for charging the battery;
a charging circuit for connecting the charging inlet to the first inverter via a neutral point of the first motor; and
a control device for controlling an operation of the first inverter, wherein:
the charging circuit includes a charging smoothing capacitor provided between the charging inlet and the first motor; and
after charging of the battery by the charging device is completed, the control device causes the first inverter to execute a boosting operation, and discharges electric charge accumulated in the charging smoothing capacitor from the first inverter to the battery side.

2. The electrified vehicle according to claim 1, wherein:
the charging circuit further includes a first relay provided between the charging inlet and the charging smoothing capacitor; and
the control device electrically opens the first relay before executing the boosting operation.

3. The electrified vehicle according to claim 1, wherein:
the electrified vehicle further includes a second relay provided between the battery and the first inverter; and
the control device electrically opens the second relay before starting the boosting operation.

4. The electrified vehicle according to claim 3, wherein:
the electrified vehicle further includes a smoothing capacitor for traveling provided between the battery and the first inverter;
the charging circuit further includes a third relay provided between the charging smoothing capacitor and the neutral point of the first motor; and
the control device
electrically opens the third relay after completing the boosting operation, and
controls the first inverter and electrically connects the smoothing capacitor for traveling and the first motor after opening the third relay.

5. An electrified vehicle comprising:
a first motor for driving a first wheel of the electrified vehicle;
a battery for supplying power to the first motor;
a first inverter that is provided between the battery and the first motor and converts direct current power from the battery to alternating current power supplied to the first motor;
a charging inlet that is detachably connected to an external charging device and receives charging power for charging the battery;
a charging circuit for connecting the charging inlet to the first inverter via a neutral point of the first motor;
a second motor for driving a second wheel of the electrified vehicle;
a second inverter that is provided between the battery and the second motor, and the battery and the first inverter, and converts direct current power from the battery to alternating current power supplied to the second motor;
a specific relay provided between the battery and the second inverter; and
a control device for controlling operations of the first inverter and the second inverter, wherein:
the charging circuit includes a charging smoothing capacitor provided between the charging inlet and the first motor; and
the control device
opens the specific relay after charging of the battery by the charging device is completed, and
discharges electric charge accumulated in the charging smoothing capacitor from the second inverter by controlling the second inverter and electrically connecting the second inverter and the second motor after opening the specific relay.

* * * * *